United States Patent [19]

Redmond, Jr.

[11] 4,298,343

[45] Nov. 3, 1981

[54] REINFORCED BELT SPLICE

[75] Inventor: John D. Redmond, Jr., Littleton, Colo.

[73] Assignee: The Gates Rubber Company, Denver, Colo.

[21] Appl. No.: 128,749

[22] Filed: Mar. 10, 1980

[51] Int. Cl.³ .............................................. F16G 3/02
[52] U.S. Cl. ..................................... 474/255; 24/38
[58] Field of Search ...................... 198/844, 846, 847; 474/253, 255, 256; 24/31 L, 31 H, 33 P, 33 M, 38

[56] References Cited

U.S. PATENT DOCUMENTS

| | | | |
|---|---|---|---|
| 2,488,872 | 11/1949 | Mathieu | 198/847 |
| 2,799,177 | 7/1957 | Henson | 198/847 |
| 3,036,944 | 5/1962 | White et al. | 198/847 |
| 3,212,627 | 10/1965 | Beebee | 198/847 |
| 3,664,490 | 5/1972 | Maruyama | 198/847 |
| 3,744,095 | 7/1973 | Tomlinson | 74/231 J |

OTHER PUBLICATIONS

"Timing Belt Splicing Manual", Uniroyal Industrial Products Division, Aug. 11, 1972.

*Primary Examiner*—Lawrence J. Staab
*Attorney, Agent, or Firm*—H. W. Oberg, Jr.; Raymond Fink; Curtis H. Castleman, Jr.

[57] ABSTRACT

A reinforced, mechanical splice for toothed belts, the splice defined by overlapping belt end portions that interfit with each other with a male-end belt tongue portion having transversely oriented belt teeth with molded end receiving openings, and a female-end belt U-portion dimensioned to receive the male-end portion and having transversely aligned belt teeth with molded pin receiving openings so adapted and arranged for coaxial alignment with the male-end pin receiving openings such that the belt teeth of the male-end portion are aligned with the belt teeth of the female-end portion, the belt teeth of both end portions having an embedded reinforcement circumjacent to the pin receiving openings. The belt splice is formed by positioning a twined reinforcement around a polymeric rod, placing the rod with reinforcement in a mold such as successive tooth cavities, placing a circumferentially oriented tensile member next to the rod and reinforcement, embedding the rod, reinforcement, and tensile member in an elastomeric matrix forming a toothed belt, and cutting through the belt at the tensile member, rod and reinforcement and forming a male-end belt tongue portion and a female-end belt U-portion.

7 Claims, 5 Drawing Figures

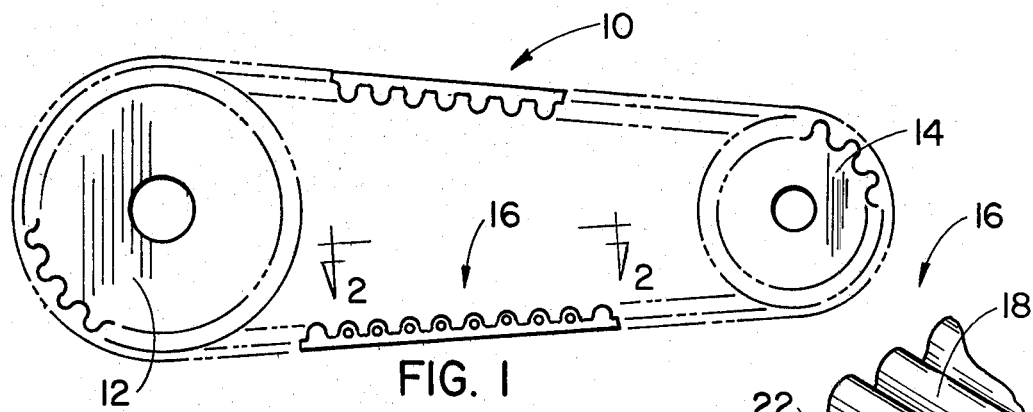
FIG. 1
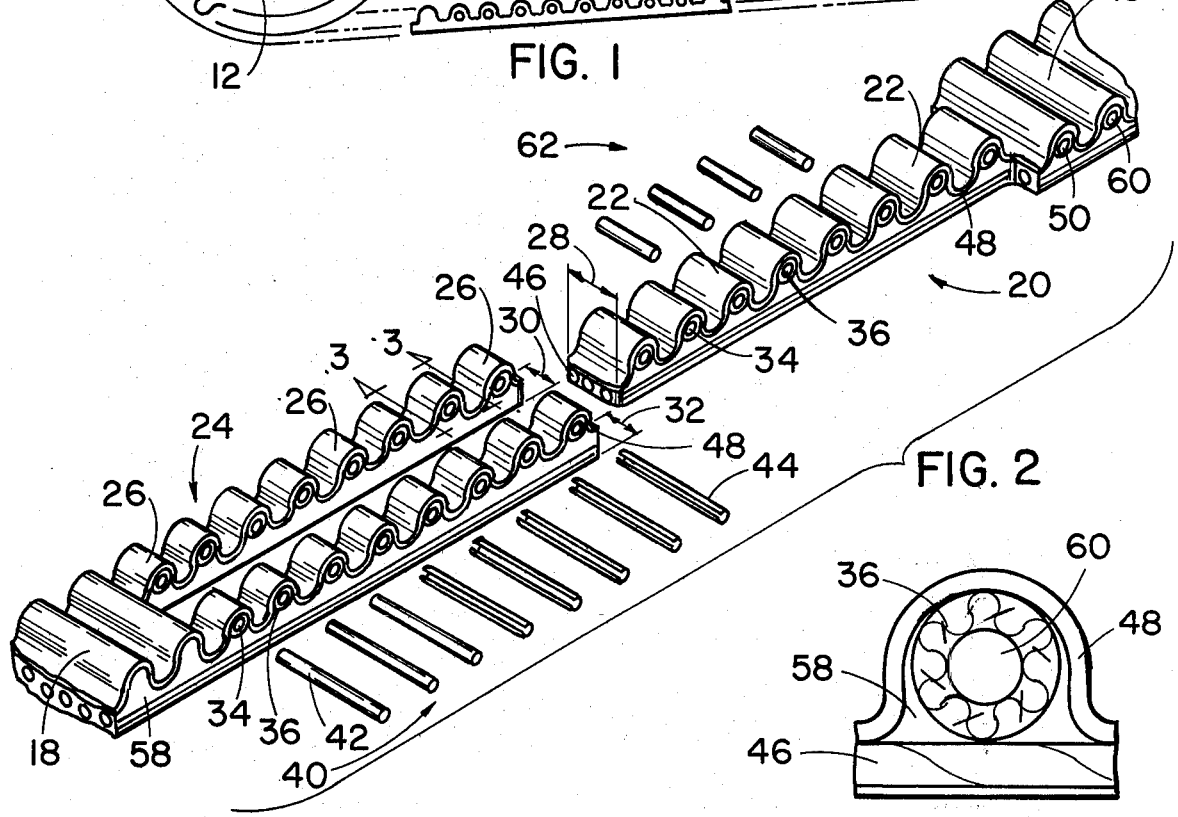
FIG. 2
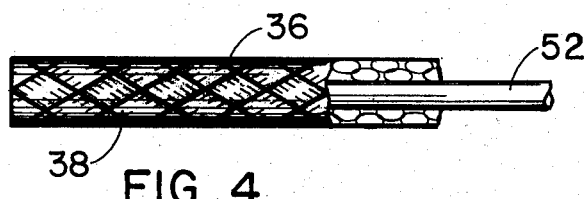
FIG. 4
FIG. 3
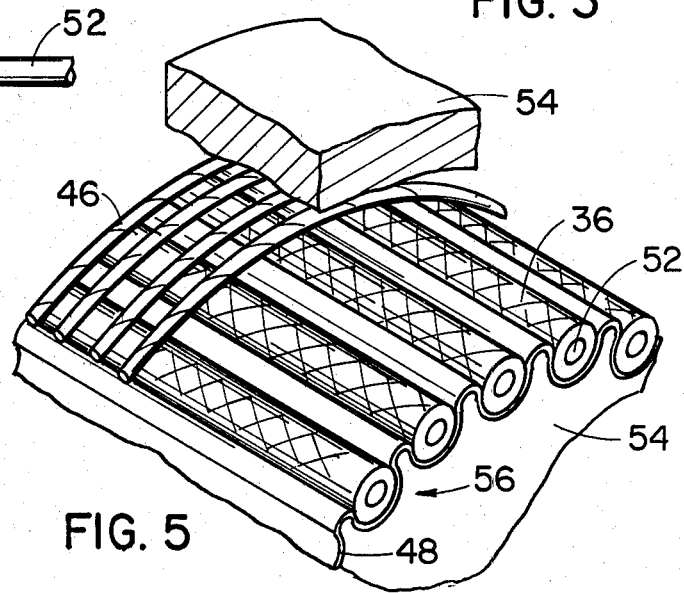
FIG. 5

REINFORCED BELT SPLICE

BACKGROUND OF THE INVENTION

The invention relates to belt couplers, but more particularly, the invention relates to a mechanical splice formed at contiguous belt ends that match or interfit with each other and are held together by pins embedded transversely of the belt.

It is often necessary or convenient to form an endless belt by joining belt ends with a mechanical splice. Some type of fastener such as pins or rivets are usually used in mixing the splice. An example of an interfitting mechanical splice for toothed belts appears in U.S. patent application No. 06/038,975 where a male-end belt tongue portion interfits with a female-end U-portion so that belt teeth of the male-end are aligned with belt teeth of the female-end. Holes are molded through the aligned belt teeth (i.e., laterally of the belt) and pins are inserted in the holes retaining the belt ends together. While such a "molded hole" belt splice is an improvement over a "drilled and pinned" splice of similar configuration, the molded holes are difficult to make and keep in alignment and the belt teeth have a tendency to distort when in use which may initiate splice failure. Also, it is difficult to demold metal rods that form the molded holes, particularly in wide belts.

Some belts use a reinforcement to provide a wear-resistant surface such as in U.S. Pat. No. 3,772,929, or to increase transverse rigidity such as in variable speed cog belt as shown in U.S. Pat. No. 2,514,429 at FIG. 4. While such reinforcements solve problems of tooth strength and belt transverse rigidity, they do not solve problems associated with mechanical belt splicing techniques or hole molding techniques.

SUMMARY OF THE INVENTION

A mechanical belt splice is provided for belting of the integrally molded, elastomeric type. Male and female belt end portions, with transversely oriented molded, pin receiving holes, interfit with each other with molded holes of each end in alignment with each other so that pins may be inserted in the holes to complete the splice by holding the end portions together. Fibrous reinforcements are disposed in the belt circumjacent the pin receiving holes to not only strengthen the holes for improved splice performance, but also, to improve the manufacturing process for aligning and locating the holes.

In the manufacturing process, a tubular fibrous reinforcement is placed around a plurality of rods and the rods are placed transversely in a belt mold cavity. The rods with reinforcements are then embedded in an elastomeric matrix without bonding the rods to the matrix. A belt end of desired over-lapping configuration is formed by cutting across the belt body and through the rods and fibrous reinforcement.

An object of this invention is to provide a mechanical belt splice having molded pin receiving holes with a tubular fibrous reinforcement juxtaposed holes to provide additional strength at the belt splice.

Another object of the invention is to provide a method for making a mechanical belt splice with holes molded transversely of the belt. An advantage of the invention is the ease in manufacturing and preparing the belt splice.

These and other objects or advantages of the invention will be more apparent after reviewing the drawings and description thereof wherein:

FIG. 1 is a side view of an endless belt drive system using a spliced belt of the invention;

FIG. 2 is an isometric exploded view taken along the lines 2—2 of FIG. 1;

FIG. 3 is an enlarged view taken along the lines 3—3 of FIGS. 2;

FIG. 4 is a partially cutaway side view showing a rod with a fibrous reinforcement; and FIG. 5 is a schematical fragmentary view of a belt mold cavity having the fibrous reinforced rods of FIG. 4 placed therein.

DESCRIPTION OF ILLUSTRATED EMBODIMENTS

In the Figures, a spliced belt 10 is entrained in endless path around two pulleys 12, 14 to form a belt drive system. The belt splice 16 of the invention may be useful for several different types of belts; however, a toothed belt is used for illustration which has a plurality of spaced, transversely oriented belt teeth 18. A male-end belt tongue portion 20 has two or more successive belt teeth portions 22, and a female-end belt U-portion 24 having at least two successive belt teeth portions 26, is dimensioned to receive and interfit with the male-end portion in a side-by-side overlapping fashion. Optionally, the male-end and female-end portion are generally rectangular with substantially constant widths where the width 28 of the male-end portion is about equal to the cumulative widths 30, 32 of the overlapping female-end belt portion.

The toothed belt portions have molded pin receiving holes 34 aligned along the tooth axis and so located that when the belt ends are interfitted with each other, the holes of the male-end are substantially coaxially aligned with the holes of the female-end and the successive belt toothed portions of the male and female-end are correspondingly aligned.

The pin receiving holes have circumjacent fibrous reinforcement 36. The fibrous reinforcement is preferably tubular and extends the width of the belt tooth portions. Optionally, the fibrous reinforcement is in the form of a tubular braid 38.

Pins 40 capable of assembly with the belt, such as solid pins 42 or rolled pins 44, are inserted in the molded holes of the overlapped ends to complete the mechanical splice.

Splices are useful for belts made by different processes and having various constructions. For example, a belt may be made with the typical elastomers such as natural and synthetic rubbers and blends thereof, polyester and polyurethane. Also, a toothed belt may have any desired tooth profile such as curvilinear, round, trapezoidal, etc., and may include any of the typical reinforcements such as a tensile member 46 and wear-resistant fabric 48.

Method

Pin receiving holes are molded in the belt during the manufacturing process. Molded holes are provided in at least those belt teeth portions intended for splicing. Optionally, holes 50 are molded in each belt tooth so that a belt splice may be located at any desired point along the belt. The holes may have any desired cross section to receive a pin of similar cross section. However, a circular cross section works well for receiving substantially cylindrical pins.

In forming the molded pin receiving openings, a fibrous reinforcement 36 is disposed around a rod 52. The rod may be of any desired material but it is preferably made of a polymer that will not adhere to the chosen elastomer. For example, a polypropylene rod will not adhere to polyurethane. Optionally, release agents may be applied to the rod so that it will not adhere to the belt elastomer during curing. The rod with fibrous reinforcement is transversely positioned in a mold 54 and optionally, a transversely oriented tooth cavity 56. If a wear-resistant fabric 48 is used at the belt exterior, the rod with fiber reinforcement is positioned atop such fabric that is previously placed in undulating fashion in the mold cavity. Preferably, the rod and reinforcement have a cumulative diameter to fill a major thickness portion of the mold cavity. The reinforcement contacts the mold or fabric to locate and align the rod in a generally central position within the mold cavity 56. The rods may be either adhered in place or retained in position with the tensile member 46 spirally wound over the rod and reinforcement. The belt tensile member 46 is positioned generally perpendicular to the rods 52 and fibrous reinforcement 36. The rods are embedded in an elastomeric matrix without bonding the rods to the matrix when defining the belt body 58. In the case of a liquid casting system, the mold is filled with an elastomer such as polyurethane.

FIG. 5 is merely illustrative of placing the rods with reinforcement in a mold cavity. FIG. 5 is also representative of the procedure followed when using rubber or blends thereof. In the case of rubber, the tubular reinforcement is dipped with a rubber elastomer system such as latex to fill the interstices of the fibrous reinforcement 36. Additional layers or plies of elastomeric material are placed over the rod and reinforcement before spiralling the endless tensile member. Additional plies or layers of rubber or rubber impregnated fabrics may be positioned over the tensile member. Pressure is then applied to the system such as by a bladder to completely fill the mold cavity with elastomer.

The process yields a belt sleeve from which one or more belts of desired widths may be circumferentially cut. During the cutting process, the polymeric rods are severed and optionally may remain a part 60 of the belt. A rule die may then be used to cut the belt splice of any desired configuration. Again, the rule die is preferably used to cut through the polymeric rods with fibrous reinforcement leaving small polymeric rod portions 62 that may be removed from the belt. The belts may be manufactured in circular endless form and then cut or the belts may be manufactured using the flat, continuous technique such as known for conveyor belting.

When a splice is to be made, the unadhered polymeric rods are pushed from the belt to reveal pin receiving openings characterized by a contiguous molded surface of the removed polymeric rod. The unadhered polymeric rods may be extracted from the belt either before or after the belts ends are cut.

The foregoing detailed description is made for purpose of illustration only and is not intended to limit the scope of the invention which is to be determined from the appended claims.

What is claimed is:

1. In a toothed power transmission belt with an elastomeric body severed to a desired width and having an embedded tensile member, the belt adapted for splicing to endless form and wherein the improvement comprises:

a male-end belt portion having a plurality of substantially parallel rods, each rod embedded in a belt tooth and unadhered to the body, the rods oriented with and severed at the belt width;

a female-end belt portion dimensioned to receive the male-end portion and having a plurality of substantially parallel rods, each rod embedded in a belt tooth and unadhered to the body, the rods of the female-end portion severed at the belt width and having axes arranged for coaxial alignment with axes of the male-end rods when the male-end portion is overlapped with the female-end portion; and whereby said unadhered rods may be extracted from said ends to define a plurality of pin receiving openings.

2. The splice configuration as claimed in claim 1 wherein a generally tubular fibrous reinforcement is embedded in said body around said pin receiving openings.

3. The power transmission belt as claimed in claim 1 wherein said rods are of a polymeric material.

4. The power transmission belt as claimed in claim 1 wherein said rods are severed at lengths corresponding to widths of the male-end and female-end belt portions.

5. A method for making a spliceable power transmission belt of the toothed type comprising the steps of:

placing rods in a belt mold cavity and positioning them in spaced, substantially parallel relationship in tooth cavities across the mold;

positioning a belt tensile member generally perpendicular to the rods embedding the rods and the tensile member in an elastomeric matrix without bonding the rods to the matrix whereby they may be selectively removed severing the elastomeric matrix to define a belt body of desired width and simultaneously severing the rods at the belt width; and cutting across the belt body and tensile member, at a desired profile to define at least one end of an overlapping type belt splice.

6. The method as claimed in claim 5 which includes the step of simultaneously cutting the rods when cutting the belt body to define one end of the belt splice.

7. The method as claimed in claim 5 which includes the step of pushing the cut rods out of the belt body.

* * * * *